United States Patent
Near (10) Patent No.: US 6,978,978 B2
(45) Date of Patent: Dec. 27, 2005

(54) PWM VOLTAGE CLAMP FOR DRIVER CIRCUIT OF AN ELECTRIC FLUID DISPENSING GUN AND METHOD

(75) Inventor: Timothy P. Near, Alpharetta, GA (US)

(73) Assignee: Nordson Corporation, Westlake, OH (US)

( * ) Notice: Subject to any disclaimer, the term of this patent is extended or adjusted under 35 U.S.C. 154(b) by 372 days.

(21) Appl. No.: 09/880,649

(22) Filed: Jun. 13, 2001

(65) Prior Publication Data

US 2002/0050579 A1 May 2, 2002

Related U.S. Application Data

(60) Provisional application No. 60/244,512, filed on Oct. 31, 2000.

(51) Int. Cl.[7] .............................................. F16K 31/002
(52) U.S. Cl. ................... 251/129.05; 361/154; 361/187
(58) Field of Search ...................... 251/129.05; 361/154, 361/187

(56) References Cited

U.S. PATENT DOCUMENTS

| | | | | |
|---|---|---|---|---|
| 3,747,576 A | * | 7/1973 | Gordon et al. ............... | 123/492 |
| 4,214,290 A | * | 7/1980 | Sloan ......................... | 361/154 |
| 4,812,945 A | * | 3/1989 | D'Onofrio ................... | 361/154 |
| 4,878,147 A | * | 10/1989 | Oyama et al. ............... | 361/154 |
| 4,890,188 A | * | 12/1989 | Russell et al. ............... | 361/154 |
| 4,898,361 A | * | 2/1990 | Bender et al. ......... | 251/129.05 |
| 5,645,097 A | * | 7/1997 | Zechmann et al. ............. | 137/1 |
| 5,737,172 A | * | 4/1998 | Ohtsuka ...................... | 361/154 |
| 5,748,431 A | * | 5/1998 | Goodnight et al. ......... | 361/154 |
| 5,812,355 A | * | 9/1998 | Nojima ........................ | 361/152 |
| 5,876,102 A | * | 3/1999 | Mori et al. .................. | 303/156 |
| 5,884,896 A | * | 3/1999 | Kono et al. ............ | 251/129.05 |

* cited by examiner

*Primary Examiner*—Michael Mar
*Assistant Examiner*—Melvin A. Cartagena
(74) *Attorney, Agent, or Firm*—Wood, Herron & Evans, L.L.P.

(57) ABSTRACT

An electric fluid dispenser for dispensing a fluid onto a substrate. A power switching circuit is connected to an unregulated power supply providing a varying voltage. A solenoid connected to the power switching circuit operates a dispensing valve to move between open and closed positions. A control circuit is responsive to the varying voltage from the power supply and provides a drive signal to the power switching circuit having a time variable component determined by the varying voltage. The power switching circuit, in response to the drive signal, provides an output signal to the solenoid that causes the dispensing valve to move between the open and closed positions substantially independent of the varying voltage from the unregulated power supply.

12 Claims, 3 Drawing Sheets

PWM VOLTAGE CLAMP FOR DRIVER CIRCUIT OF AN ELECTRIC FLUID DISPENSING GUN AND METHOD

This application claims the benefit of U.S. Provisional Application No. 60/244,512 entitled, "PWM Voltage Clamp for Driver Circuit of an Electric Dispensing Gun and Method", filed on Oct. 31, 2000.

FIELD OF THE INVENTION

The present invention relates generally to fluid dispensing systems for dispensing flowable material, such as adhesives, sealants, caulks and the like, onto a substrate and, more particularly, to a driver circuit for controlling an operation of a solenoid-actuated valve within an electric dispensing gun.

BACKGROUND OF THE INVENTION

Electric fluid dispensers have been developed for dispensing applications requiring a precise placement of a fluid, for example, an adhesive, onto a moving substrate, for example, packaging or a woven product. Dispensing guns of this type include a liquid passage that communicates between a pressurized adhesive supply and a valve mechanism provided at the end of the liquid passage. The valve mechanism is typically a movable valve stem positioned to selectively obstruct a dispensing orifice formed in a valve seat. The valve stem is extended and retracted relative to the valve seat in a controlled manner by a solenoid for providing repeatable and accurate dispense patterns of the liquid onto the moving substrate. Generally, the solenoid comprises an electromagnetic coil surrounding an armature that is energized to produce an electromagnetic field with respect to a magnetic pole, thereby moving the valve stem. More specifically, the forces of magnetic attraction between the armature and the magnetic pole move the armature and valve stem toward the pole, thereby opening the dispensing valve. At the end of a dispensing cycle, the electromagnet is de-energized, and a return spring returns the armature and valve stem to their original positions, thereby closing the dispensing valve.

Dispensing systems have been developed that employ driver circuits to control the operation of the solenoid within the dispensing gun. To open the valve, the driver circuit applies a fast pull-in current to the solenoid coil to quickly retract the valve stem and open the dispensing orifice at the beginning of a dispensing cycle. The driver circuit maintains a minimal holding current which holds the valve stem in an open position while minimizing the amount of heat build-up in the solenoid coil during the dispensing cycle. Finally, the driver circuit provides a fast demagnetization of the solenoid so the valve stem is quickly closed over the orifice at the end of the dispensing cycle.

Closing of the valve stem is often achieved by a spring mechanism connected to one end of the valve stem. When the solenoid is sufficiently demagnetized, the stored energy in the compressed spring mechanism forces the valve stem to the closed position and in sealing engagement with the dispensing orifice. One example of such a dispensing system is set forth in U.S. Pat. No. 5,812,355, owned by the assignee of the present invention, the disclosure of which is incorporated herein by reference in its entirety.

In unregulated gun drivers, current to the electric gun coil is supplied by a power switching circuit that is connected to an unregulated power supply. Thus, any variations in line voltage changes the output voltage from the power supply which is applied to the power switching circuit. Changing the voltage applied to the power switching circuit results in a corresponding variation in the current being supplied to the gun solenoid. The operational speed of the solenoid is directly related to the magnitude of the applied voltage; and therefore, as the magnitude of the applied voltage goes up, the armature and valve stem move faster. Similarly, as the magnitude of the applied voltage goes down, the armature and valve stem move slower. Thus, the operational speed of the armature and valve stem is related to the magnitude of the voltage applied to the coil and hence, the actuation time or time required to open and close the electric gun is changed by variations in line voltage applied to the unregulated power supply.

Uncontrolled and unpredictable variations in the actuation time of the dispensing gun adversely impact the adhesive deposition process. Line voltage variations changing the actuation time of the dispensing gun also change the starting and stopping locations of the dispensed adhesive on the substrate. If adhesive is to be dispensed on a package flap moving past the dispensing gun, an increase in line voltage causing the gun to switch-on or open faster than expected may cause adhesive to be dispensed too soon. Opening the gun too soon may cause adhesive to be dispensed prior to a leading edge of the flap reaching the dispensing location. Similarly, a decrease in line voltage causes the gun to switch-off or close slower than expected. This slower gun operation may cause adhesive to continue to be dispensed after a trailing edge of the flap passes the dispensing location. Any unpredicted dispensing of adhesive onto a surface not intended to receive adhesive, potentially results in a scrap product. In addition, spurious adhesive spray that misses the substrate may lead to additional, time consuming, labor intensive and expensive cleaning and maintenance of equipment and areas adjacent the adhesive dispensing gun. Thus, such line voltage variations may result in a less efficient, less economical and/or lower quality fluid dispensing operation.

It is known to use a regulated gun driver, that is, a gun driver with a regulated power supply. A regulated gun driver provides a constant voltage to the coil independent of the voltage variations to the power switching circuit. Thus, with respect to line voltage variations, the use of a regulated gun driver provides a more consistent dispensing gun performance. However, regulated gun drivers are more expensive than unregulated gun drivers and create more heat which requires more cooling and thus, further adds to their cost.

Therefore, there is a need to provide an electric fluid dispenser that uses an unregulated solenoid gun driver that is insensitive to variations in the applied line voltage.

SUMMARY OF THE INVENTION

The present invention provides an unregulated gun driver for a fluid dispenser that has an improved performance. The gun driver of the present invention executes a stable, consistent and high quality fluid dispensing process independent of line voltage variations. Further, the gun driver of the present invention has the advantages of being less expensive, operating more efficiently with less power loss and requiring less cooling than regulated gun drivers. In addition, the unregulated gun driver of the present invention can be readily added to many existing gun driver circuits. Thus, the fluid dispenser of the present invention is especially advantageous in those applications where better performance is required at a lesser cost.

In accordance with the principles of the present invention and the described embodiments, the invention in one embodiment provides an electric fluid dispenser for dispensing a fluid onto a substrate. The dispenser has a dispensing valve movable between open and closed positions for controlling a flow of the fluid from said fluid dispenser. The dispenser further has a source of power providing a nonconstant voltage to a power switching circuit. A solenoid is connected to the power switching circuit and is capable of causing the dispensing valve to move between the open and closed positions. A control circuit is responsive to the nonconstant voltage and provides a drive signal having a time variable component determined by the nonconstant voltage from the source of power. The power switching circuit, in response to the control signal, provides an output signal to the solenoid causing said dispensing valve to move between the open and closed positions substantially independent of variations in the nonconstant voltage.

In one aspect of the invention, the control circuit provides an initial peak current followed by a hold current to energize said solenoid, and the control circuit provides the initial peak with an initial duty cycle varying as an inverse function of the variations of the nonconstant voltage from the power source.

In another embodiment of the invention, a method is provided for operating an electrically operated fluid dispenser for dispensing a fluid onto a substrate. The fluid dispenser has a dispensing valve operatively connected to an electrically operated solenoid, and the dispensing valve is movable between open and closed positions for controlling a flow of the fluid from the fluid dispenser. A power switching circuit is connected to a power source supplying a varying voltage. A drive signal is produced having a time variable component determined as a function of the varying voltage of the power source, and the drive signal is applied to the power switching circuit to operate the solenoid and dispensing valve substantially independently of the varying voltage of the power source.

In one aspect of this invention, the drive signal has an initial peak current followed by a hold current, and the method further comprises modulating a leading edge of the initial peak current at a duty cycle determined as an inverse function of the varying voltage of the power source.

Various additional advantages, objects and features of the invention will become more readily apparent to those of ordinary skill in the art upon consideration of the following detailed description of embodiments taken in conjunction with the accompanying drawings.

DETAILED DESCRIPTION OF THE INVENTION

Figure 1:
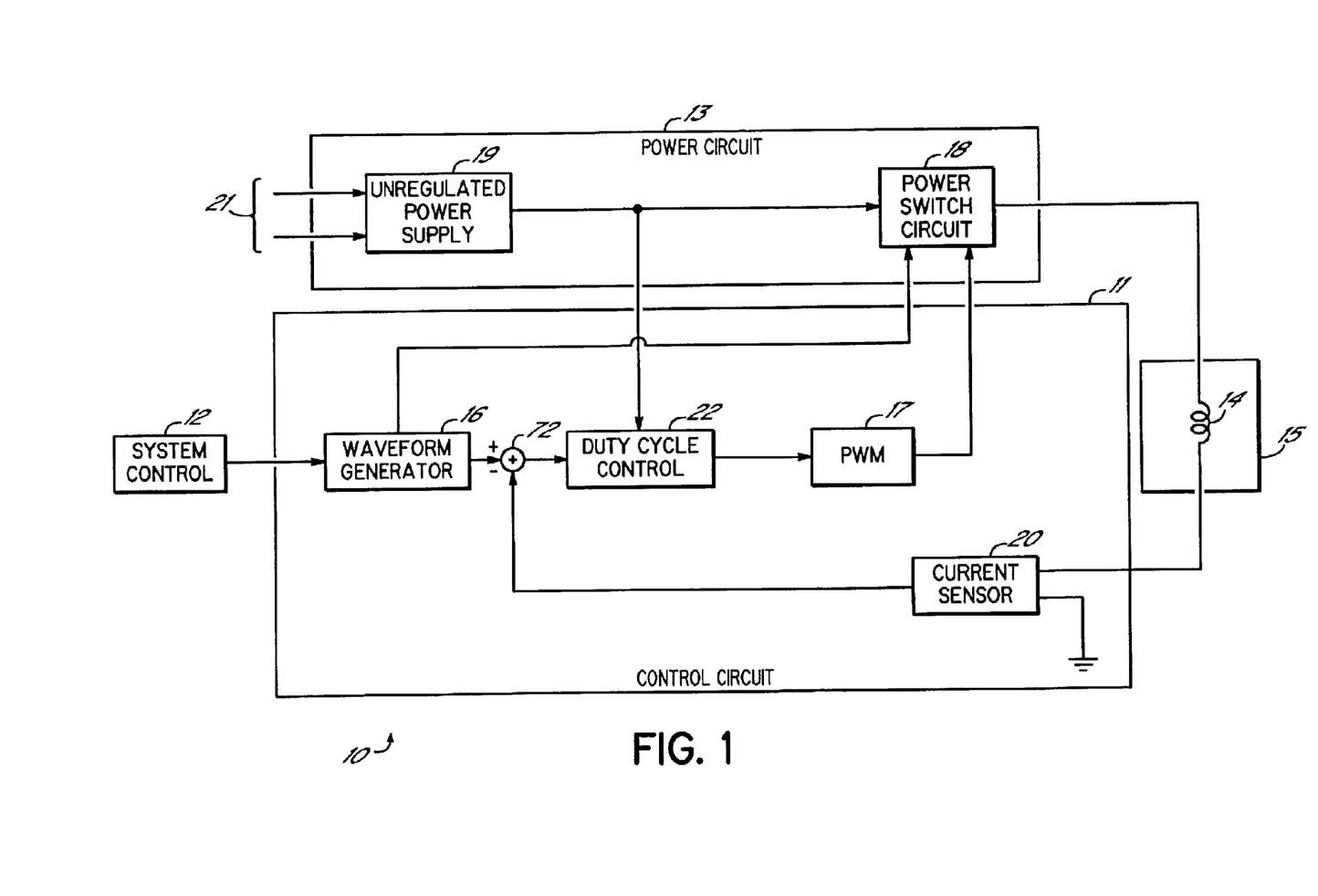
FIG. 1 is an schematic block diagram of a dispensing gun driver for an electric fluid dispenser in accordance with the principles of the present invention.

FIG. 1 illustrates an unregulated gun driver or controller 10 for an electric fluid dispensing gun normally used to dispense adhesive onto a substrate moving with respect to the gun. As previously discussed, electric guns are preferred because of the precision with which they may be controlled during a fluid dispensing operation. The gun driver 10 has a control circuit 11 operating in response to signals from a system control 12 to provide a stepped waveform to a power circuit 13. The system control 12 includes all of the other known dispensing system or machine controls necessary for the operation of the dispensing system, for example, a pattern control. The system control 12 also includes input devices such as a keypad, pushbuttons, etc. and output devices such as a display, indicator lights, etc. that provide communication links with a user in a known manner. Within the power circuit 13, a power switch circuit 18 is connected to an unregulated power supply 19 and provides a stepped current waveform to a solenoid coil 14 within an electric dispensing gun 15.

To turn the gun on, the system control 12 provides a trigger signal to a waveform generator 16. The waveform generator 16 initially sets the duty cycle of a PWM 17 to a high level, for example, 100%, thereby operating a power switch circuit 18 at an equally high rate. The power switch circuit 18 is connected to an unregulated power supply 19 and applies an initial pull-in current magnitude $I_{pk}$ (FIG. 2A) to the coil 14. Upon reaching the desired current setpoint or value determined by the waveform generator 16, the PWM 17 operates with a lesser duty cycle, for example, 60%, to maintain the current at the desired peak current value $I_{pk}$.

A current sensor 20 is often used to provide a current feedback signal to a summing junction 72 so that the current in the coil 14 is maintained at the desired setpoint value provided by the waveform generator 16. An initial peak current pulse 200 (FIG. 2A) is maintained for a duration $T_{pk}$ as determined by the waveform generator 16. The large initial peak current $I_{pk}$ is effective to quickly open the dispensing gun 15.

After opening the dispensing gun 15, the gun driver 10 supplies a current necessary to hold the dispensing gun 15 open by overcoming the opposing force of a return spring (not shown). After the peak current duration $T_{pk}$, the waveform generator 16 substantially reduces the duty cycle of operation of the PWM 17, for example, to 20%. Reducing the duty cycle of the PWM 17 also reduces the duty cycle of the power switch 18. The reduced duty cycle causes the power switch circuit 18 to apply a lesser, hold current magnitude $I_h$ 202 (FIG. 2A) to the coil 14 for the remaining period of the dispensing cycle on-time $T_{on}$. At the end of the dispensing cycle as determined by a pattern control (not shown) within the system control 12, the dispensing gun 15 is turned off or closed. In many dispensing guns, current to the coil is reduced to zero or a minimal valve; and current induced in the coil from the collapsing inductive field is dissipated. A return spring moves an armature and valve stem in an opposite direction to close the dispensing gun. A zero or minimal current is then maintained for an off time during the remaining time of the current waveform period.

Figure 2A:
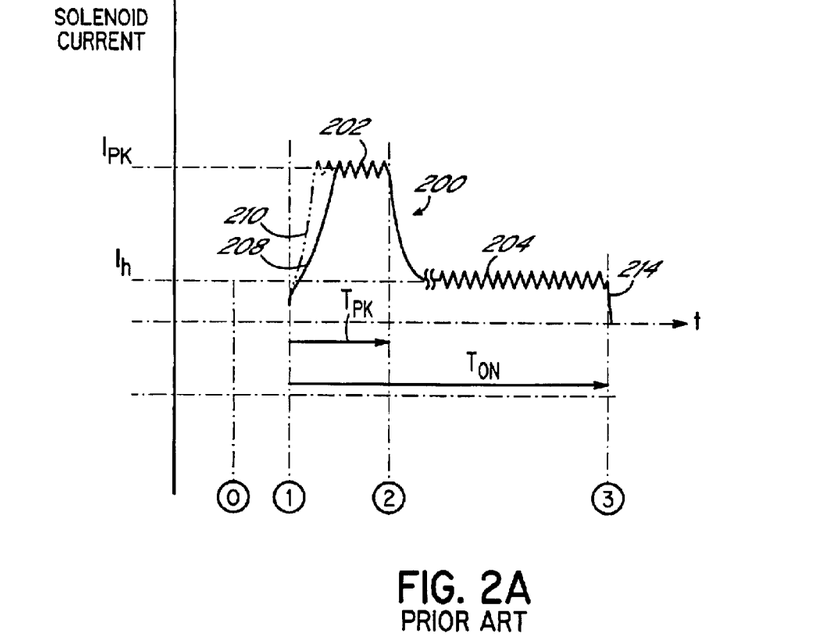
FIG. 2A is a schematic diagram of a current waveform provided by a prior art driver circuit that does not use the gun driver of FIG. 1.
Figure 2B:
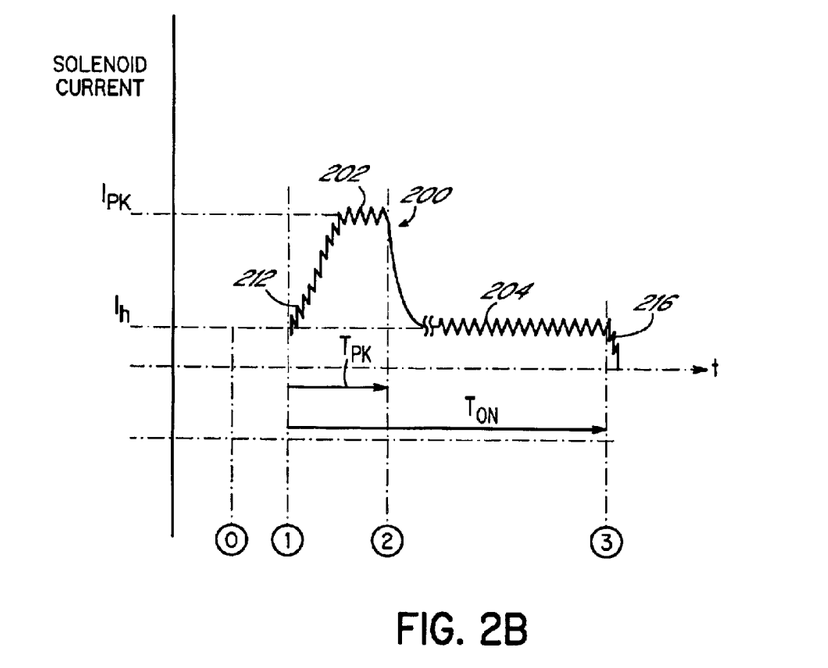
FIG. 2B is a schematic diagram of a current waveform provided by the gun driver of FIG. 3.

As will be appreciated, the waveforms illustrated in FIG. 2 are for purposes of discussion; and the real waveform consists of exponential functions that transition the current between levels. The real time, on time wave shape can look radically different from the idealized waveforms of FIG. 2, depending on many factors such as $I_{pk}$, $I_h$, $T_{pk}$, $T_{on}$, $T_p$, $L_{coil14}$, $R_{coil14}$, etc. The $T_{on}$ is related to the adhesive pattern required for a particular product. The inductance and resistance of the coil are a function of the gun itself, and the $I_{pk}$ is normally bounded by various considerations of the fluid dispenser 15 such as magnetic saturation, thermal considerations or force requirements.

Initial values of magnitudes of the peak and hold currents are based on the coil specifications. However, the peak current magnitude $I_{pk}$, the magnitude of the hold current $I_h$ and the duration of the peak current $T_{pk}$ are often adjustable by the user. The user may adjust the current waveform and the dispensing line rate in order to tune the dispensing operation to its peak performance.

While the gun driver 10 of FIG. 1 performs well, there is one condition which impairs its performance. The gun driver 10 is designed to provide a desired opening time of the dispensing gun 15 for a given output voltage, for example, 240 $V_{DC}$, from the power supply 19. The rate of current flow through the coil 14 is a function of the power supply voltage and the inductance of the coil 14. Thus, with the power supply voltage of 240 $V_{DC}$ and a constant coil inductance, the rate of current flow through the solenoid coil 14 is represented by the slope 208 of FIG. 2A. Further, by design, the slope 208 provides a current flow to the solenoid coil 14 so that the dispensing gun 15 opens at a desired speed or within a desired time duration to dispense adhesive onto the substrate at a desired location.

However, in many environments, the magnitude of the line voltage from the source 21 varies, thereby adversely affecting the actuation time of the dispensing gun 15. Assume that the line voltage from the supply 21 rises, thereby increasing the output voltage from the power supply 19, for example, to 300 $V_{DC}$. The increased power supply voltage of 300 $V_{DC}$ increases the rate at which current flows to the solenoid coil as shown in phantom by the slope 210 of FIG. 2A. Increasing the rate at which current is supplied to the solenoid coil 14 causes the dispensing gun 15 to open more quickly than with 240 $V_{DC}$. Opening the dispensing gun more quickly, or sooner than desired, causes adhesive to be dispensed earlier than anticipated; and hence, adhesive is dispensed onto surfaces not intended to receive adhesive. The improper placement of adhesive often produces scrap product and other problems.

To ameliorate that problem, the control circuit 11 of FIG. 1 has a duty cycle control 22 that functions, at appropriate times, to clamp the duty cycle of the PWM 17 at a desired value. That action makes the operation of the power switch circuit 18 independent of changes in the magnitude of the line voltage of the supply 21 and the unregulated output voltage from the power supply 19. In the example described above, one can observe that it is desirable that the rise in the initial current pulse have a constant slope 208 independent of variations in the power supply voltage $V_{DC}$. One method of stabilizing the rate of current flow at the beginning of the peak current pulse is to reduce the magnitude of the effective voltage applied to the solenoid coil 14 from the power switch circuit 18 as a function of the increase in power supply voltage. The effective voltage is the product of the power supply voltage $V_{DC}$ and the duty cycle. Limiting the duty cycle in the coil 14 in inverse proportion to increases in the power supply voltage causes the effective voltage applied to the solenoid coil 14 to be held to a constant value. Holding the effective voltage constant provides a slope substantially approximating the slope 208 in FIG. 2A.

Referring to the above example, the slope 208 is a result of the power switch circuit 18 operating at a 100% duty cycle with a power supply voltage of 240 $V_{DC}$. If the power supply voltage increases to 300 $V_{DC}$, without any other action, current will flow to the solenoid coil 14 at a rate indicated by the slope 210, thereby causing the dispensing gun to switch faster. However, if the duty cycle of the PWM 17 is proportionally reduced and clamped to a lower value, for example, 80%, the current that is supplied by the power switch circuit 18 is limited. The current slope provided by an 80% duty cycle is represented by the slope 212 of FIG. 2B. Hence, the current slope 212 in the coil 14 at 300 $V_{DC}$ substantially approximates the current slope 208 of FIG. 2A supplied to the coil at 240 $V_{DC}$; and the operational speed and actuation time of the dispensing gun 15 is unchanged. Therefore, the time required to open the dispensing gun is maintained constant independent of variations in the line voltage of the supply 21 and the resulting variations in the output voltage $V_{DC}$ from the power supply 19. Thus, problems resulting from variations in the line voltage are eliminated.

Figure 3:
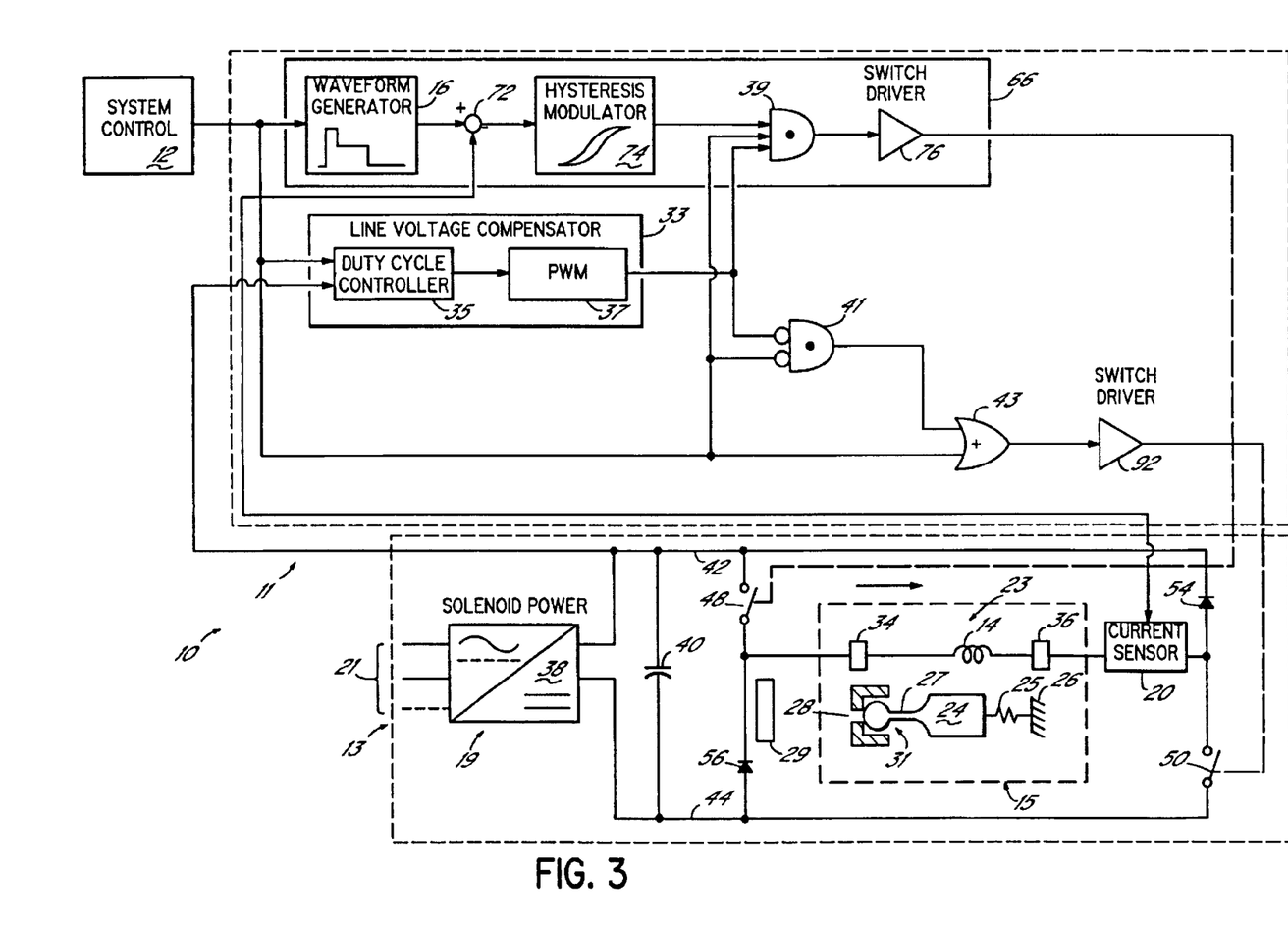
FIG. 3 is a schematic block diagram of a specific gun driver that may be used to operate a fluid dispenser in accordance with the principles of the present invention.

A specific embodiment of a gun driver is illustrated in FIG. 3, and the common numbers in FIGS. 1 and 3 refer to items that are similar in function. The gun driver or driver circuit 10 includes a control circuit 11 and a power circuit 13 for controlling operation of one or more electric dispensing guns of the type used to dispense adhesives, sealants, caulking and the like, represented diagrammatically at 15. The power circuit 13 includes an unregulated power supply 19 that is connected to a voltage source 21 providing a line voltage.

The electric dispensing gun 15 includes a solenoid 23 having a movable armature 24 to regulate the flow of liquid through the gun 15. The armature 24 is usually biased by a spring mechanism 25 that is connected between one end of the armature 24 and a fixed reference 26. The armature 24 is connected to a plunger or valve stem 27 that operatively cooperates with an orifice 28 to form a dispensing valve 31 within the electric dispensing gun 15. Retracting the armature 24 against the force of the spring mechanism 25 opens the dispensing valve 31; and pressurized adhesive flows through the orifice 28 onto a substrate 29. As is well known in the art, the armature 24 is actuated by application of current through the solenoid coil 14. The coil 14 has electrical properties modeled as a resistance in series with an inductance. The ends of the coil 14 terminate at first and second terminals 34, 36 that are selectively coupled to the power supply 19 as described in detail below.

The unregulated power supply 19 is connected to a source of power 21. The power supply 19 has an AC to DC converter 38 that is lowpass filtered by a capacitor 40 coupled across a positive output 42 and a negative output 44. The power supply outputs 42, 44 are connected to the first and second terminals 34, 36 of the solenoid 23 by switches 48, 50 as described in detail below. The switches 48, 50 may be insulated gate bipolar transistors (IGBT), although equivalent switches are contemplated.

A forward current path through the solenoid coil 14 is generated when the first switch 48 is closed connecting the first terminal 34 to the positive output 42 and the second switch 50 is closed connecting the second terminal 36 to the negative output 44. A discharge current path through the solenoid coil 14 is generated when the first and second switches 48, 50 are open, thereby connecting the second terminal 36 to the positive output 42 via a diode 54 and connecting the first terminal 34 to the negative output 44 via a diode 56. The current sensor 20 is coupled between the second terminal 36 and the junction of the second switch 50 with the diode 54. The current sensor 20 provides a current feedback to the summing node 72 in the control circuit 11 for closed loop control of the coil current. The current sensor 20 can be implemented with any one of many current measuring devices and methods, for example, a simple resistor, a Hall effect device, a current transformer, etc.

The control circuit 11 receives a gun ON/OFF signal from the system control 12. Operation of a forward current circuit 66 of the control circuit 11 is initiated by a leading edge of the gun ON/OFF signal. The forward current circuit 66 includes a waveform generator 16, a summation node 72, a hysteresis modulator 74 and a first switch driver 76. The hysteresis modulator 74 functions similarly to a variable frequency PWM. The summation node 72 compares a stored current model stored in the waveform generator 16 to the current feedback from the current sensor 20 and generates an error signal. The error signal drives the hysteresis modulator 74. During the on-time $T_{ON}$ of the current pulse, the switch driver 92 holds the switch 50 closed; and the output of the modulator 74 commands the switch driver 76 to close the switch 48 in response to the current in the coil 14 being less than the current setpoint. The switches 48, 50 provide a forward current path through the solenoid coil 14, and current in the coil 14 increases to the setpoint value. When the current in the coil 14 exceeds the current setpoint, the output of the modulator 74 commands the switch driver 76 to open the switch 48. Thereafter, the hysteresis modulator 74 modulates the switch 48 in a known manner to keep the sensed current near the current setpoints, for example, $I_{PK}$ and $I_h$. Thus, the current in the coil 14 is shown as having a saw-tooth form as the hysteresis modulator 74 modulates the operation of the switch 48 so that the current in the coil 14 approximates the desired current model being output from the waveform generator 16.

Operation of the line voltage compensation in the gun driver 10 will now be described. As shown in FIG. 2B, the electric gun driver circuit 10 is initially in a deactivated State 0 wherein the solenoid 18 has only minimal or no coil current. At State 1, the control circuit 11 receives a gun ON/OFF signal from the system control 12 in the form of a rising leading edge of a pulse. A line voltage compensator 33 includes a duty cycle controller 35 and a fixed frequency PWM 37. The PWM 37 has an output connected to one input of an AND gate 39. The other input of the AND gate 39 is connected to the output of the hysteresis modulator 74. The duty cycle controller 35 has inputs connected to the gun ON/OFF signal output from the system control 12 and the output voltage from the unregulated power supply 19. With the output voltage from the power supply 19 at its desired nominal value, for example, 240 $V_{DC}$, the duty cycle control holds the duty cycle of the PWM 37 at 100%. Thus, all of the output from the hysteresis modulator 74 passes through the AND gate 39; and as earlier described, the initial peak current will rise to its desired value along the slope 208 of FIG. 2A.

If the power supply voltage is nonconstant and rises, for example, to 300 $V_{DC}$, without any compensation, as previously described, the hysteresis modulator 74 would cause current to be supplied to the coil 14 at a rate having the slope 210 of FIG. 2A. That increased slope with no other change, increases the operational speed and decreases the actuation time of the dispensing valve 31. By opening faster, the dispensing valve 31 dispenses adhesive at a location on the substrate that is not intended to receive the adhesive.

However, with the line voltage compensator 33, that problem is eliminated. The duty cycle controller 35 senses the increase in voltage from the unregulated power supply 19 and determines a proportionality constant defined by a fraction. The fraction has a numerator equal to the desired voltage, in this example, 240 $V_{DC}$, and a denominator equal to the current power supply output voltage, for example, 300 $V_{DC}$. Thus, in this example, the proportionality constant is 0.80, and the duty cycle controller 35 sets the duty cycle of the PWM 37 to 80%. With the output from the PWM 37 reduced to 80%, only 80% of the output from the hysteresis modulator 74 passes through the AND gate 39. The switch driver 76 and power switch 48 are then modulated such that current is supplied to the coil in accordance with the slope 212 of FIG. 2B. Further, the duty cycle from the duty cycle controller 35 causes the slope 212 to approximate the slope 208 of FIG. 2A. Thus, the lower 80% duty cycle reduces the effective voltage supplied to the coil 14 during the duration of the initial peak current to the desired level, and the dispensing valve 31 moves from its closed position to its open position in the desired time. In other words, the operational speed and actuation time of the dispensing valve 31 with a power supply voltage of 300 $V_{DC}$ is the same as when the power supply voltage is 240 $V_{DC}$. Thus, the time required to open the dispensing valve is independent of changes in the line voltage at the power source 21 and resulting changes in the output voltage of the power supply 19.

At State 2, at the end of a predetermined pull-in time $T_{PK}$, the switch 48 is opened while the switch 50 remains closed, thereby disconnecting the terminal 34 from the positive supply line 42. Current in the coil drops to the desired hold current setpoint as determined by the waveform generator 16. Thereafter, the hysteresis modulator 74 again modulates the operation the switch 48 to maintain the current in the coil 14 at the hold current setpoint value. At State 3, the falling trailing edge of the gun ON/OFF signal from the system control 12 causes the current reference to go to zero.

Changes in the line voltage and the output voltage from the unregulated power supply 19 also changes the slope 214 in FIG. 2A in a similar manner as previously discussed with respect to the slope 208, thereby changing the speed and actuation time at which the dispensing valve is closed. Therefore the output of the line voltage compensator 33 is used in a similar manner as previously described to modulate the current so that, at 300 $V_{DC}$, current flows at a rate represented by the slope 216 in FIG. 2B. When a trailing edge of the gun ON/OFF signal is received from the system control 12, the inverse of the output of the PWM 37 of the line voltage compensator 33 is applied via AND gate 41, OR gate 43 and driver 92 to control the operation of the switch 50. In State 3, when the current is decreasing from the hold current, the switch 48 is opened; and the switch 50 is modulated at a duty cycle determined as a function of the change in the power supply voltage in a similar manner as earlier described. Thus, the current decreases to zero along a slope 216 in FIG. 2B that approximates the slope 214 in FIG. 2A, thereby keeping the operational speed of the dispensing valve constant. With a constant operational speed, the actuation time or time required to close the dispensing valve 31 remains constant and independent of variations in the output voltage from the power supply 19.

While the present invention has been illustrated by a description of various embodiments and while these embodiments have been described in considerable detail, it is not intended to restrict or in any way limit the scope of the appended claims to such detail. Additional advantages and modifications within the spirit and scope of the invention will readily appear to those skilled in the art. FIGS. 1 and 3 are only examples of how the present invention may be implemented, and other circuit architectures may be used to implement the principles of the present invention. For example, the gun driver 10 of FIG. 3 utilizes two switches 48, 50 to dissipate current from the coil 14. Such a switch configuration is commonly known as a ½ H-bridge driver configuration. As will be appreciated, other gun driver configurations may implement the principles of the claimed invention. For example, a full H-bridge configuration uses four switches to provide a reverse current flow through the coil in order to more quickly close the dispensing valve. As will be appreciated by those skilled in the art, the claimed invention can be readily applied to drivers having a full H-bridge configuration, thereby making operational speed and actuation time of the dispensing valve independent of changes in the magnitude of the output voltage from an unregulated power supply.

In the detailed description, a power supply voltage of 240 $V_{DC}$ is used as an example of a voltage commanding a 100% duty cycle of the PWM 37. As will be appreciated, the lowest voltage expected to be encountered in an application should be used as the voltage commanding a 100% duty cycle of the PWM 17 or the hysteresis modulator 74.

In FIG. 3 and the associated description, a variable frequency hysteresis modulator 74 is used. Such a modulator is illustrated only by way of example; and as will be appreciated, the principles of the claimed invention can be applied to other gun driver designs using different modulators. As will be further appreciated, depending on the design and application parameters, the invention may be implemented using analog, digital or a combination of digital and analog circuit components in any configuration that automatically holds the operational speed and actuation time of the dispensing valve constant and independent of variations in the output voltage of the unregulated power supply 19.

Therefore, the invention in its broadest aspects is not limited to the specific detail shown and described. Consequently, departures may be made from the details described herein without departing from the spirit and scope of the claims which follow.

What is claimed is:

1. An electric fluid dispenser for dispensing a fluid onto a substrate comprising:
   a dispensing valve movable between open and closed positions for controlling a flow of the fluid from said fluid dispenser;
   a solenoid coil operable to cause said dispensing valve to move between the open and closed positions;
   a power circuit comprising
      a power switching circuit providing a stepped current waveform to said solenoid coil, and
      an unregulated power supply providing an output voltage to said power switching circuit; and
   a control circuit comprising
      a power switch control operable to cause said power switching circuit to provide said stepped waveform comprising an initial peak current followed by a lesser hold current, said initial peak current having a rate of current flow represented by a slope of a leading edge of said initial peak current, said slope of the leading edge being produced in response to a first output voltage from the unregulated power supply,
      a current sensor providing a current feedback signal representing current flow in said solenoid coil, and
      a duty cycle control responsive to said output voltage from said unregulated power supply and said current feedback signal and being operable to cause said power switch control to maintain the slope of the leading edge of said initial peak current substantially constant in response to changes in said output voltage from said first output voltage.

2. The electric fluid dispenser of claim 1 wherein said duty cycle control is operable to cause said power switch control to modulate the leading edge of said initial peak current with a duty cycle determined as an inverse function of the output voltage from the unregulated power supply, thereby maintaining a time required to move said valve to an open position substantially constant.

3. The electric fluid dispenser of claim 1 wherein said hold current provides a rate of current flow represented by a slope of a trailing edge of said hold current, the slope of the trailing edge being produced in response to said first output voltage from the unregulated power supply, said duty cycle control is operable to cause said power switch control to modulate the trailing edge of said hold current with a duty cycle determined as an inverse function of the output voltage from the unregulated power supply, thereby maintaining a time required to move said valve to a closed position substantially constant.

4. The electric fluid dispenser of claim 1 wherein said power switch control comprises a pulse width modulator.

5. The electric fluid dispenser of claim 1 wherein said power switch control comprises:
   a waveform generator producing a stepped waveform representative of said initial peak current followed by said lesser hold current;
   a summing node responsive to said stepped waveform from said waveform generator and said current feedback signal;
   a hysteresis modulator connected to an output of said summing node; and
   said duty cycle comprises
   a pulse width modulator;
   a duty cycle controller connected to said pulse width modulator and said unregulated power supply, said duty cycle controller changing a duty cycle of said pulse width modulator in response to changes in said output voltage from said unregulated power supply; and
   a first logic circuit having inputs connected to an output of said hysteresis modulator and an output of said pulse width modulator and causing the leading edge of said initial peak current to be modulated with a duty cycle determined as an inverse function of the output voltage from the unregulated power supply.

6. The electric fluid dispenser of claim 5 further comprising a second logic circuit having an input connected to said output of said pulse width modulator and causing the trailing edge of said hold current to be modulated with a duty cycle determined as an inverse function of the output voltage from the unregulated power supply.

7. The electric fluid dispenser of claim 6 further comprising a system control providing a trigger signal to said waveform generator for initiating a generation of said stepped waveform.

8. The electric fluid dispenser of claim 5 wherein the pulse width modulator is a fixed frequency pulse width modulator.

9. A method of operating an electric fluid dispenser for dispensing a fluid onto a substrate, the fluid dispenser having a dispensing valve operatively connected to a solenoid coil, the solenoid coil being operative to move the dispensing valve between open and closed positions for controlling a flow of the fluid from the electric fluid dispenser, the method comprising:
   providing an unregulated power supply supplying an output voltage to a power switching circuit connected to the solenoid coil;
   producing with the power switching circuit a stepped current waveform having an initial peak current followed by a hold current, the initial peak current providing a rate of current flow represented by a slope of a leading edge of the initial peak current, the slope of the leading edge being produced in response to a first output voltage from the unregulated power supply;

maintaining the slope of the leading edge of the initial peak current substantially constant in response to the output voltage from the unregulated power supply deviating from the first output voltage; and applying the stepped current waveform to the solenoid coil to operate the solenoid coil and the dispensing valve with an operational speed substantially independent of changes in the output voltage from the unregulated power supply.

10. The method of claim 9 further comprising:

modulating the leading edge of the initial peak current with a duty cycle determined as an inverse function of the output voltage from the unregulated power source to maintain the slope of the leading edge of the initial peak current substantially constant; and applying the initial peak current to the solenoid coil to maintain the actuation time to open the dispensing valve substantially constant and independent of changes in the output voltage from the unregulated power supply.

11. The method of claim 10 wherein the hold current provides a rate of current flow represented by a slope of a trailing edge of the hold current, the slope of the trailing edge being produced in response to the first output voltage from the unregulated power supply, the method further comprising:

maintaining the slope of the trailing edge of the hold current substantially constant in response to the output voltage from the unregulated power supply deviating from the first output voltage; and applying the hold current to the solenoid coil to operate the solenoid coil and the dispensing valve with an actuation time to close the dispensing valve substantially independent of changes in the output voltage from the unregulated power supply.

12. The method of claim 11 further comprising modulating the trailing edge of the hold current with a duty cycle determined as an inverse function of the output voltage from the unregulated power supply.

\* \* \* \* \*

UNITED STATES PATENT AND TRADEMARK OFFICE
CERTIFICATE OF CORRECTION

PATENT NO. : 6,978,978 B2 Page 1 of 1
DATED : December 27, 2005
INVENTOR(S) : Timothy P. Near It is certified that error appears in the above-identified patent and that said Letters Patent is hereby corrected as shown below:

Column 10,
Line 27, "said duty cycle comprises" should read -- said duty cycle control comprises --.

Signed and Sealed this

Twenty-fifth Day of April, 2006

JON W. DUDAS
*Director of the United States Patent and Trademark Office*